US008639291B1

(12) United States Patent
Gailloux et al.

(10) Patent No.: US 8,639,291 B1
(45) Date of Patent: Jan. 28, 2014

(54) MOBILE PHONE OPERATION DURING LOW BATTERY CONDITION

(75) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/560,997

(22) Filed: Jul. 28, 2012

(51) Int. Cl.
*H04B 1/38* (2006.01)

(52) U.S. Cl.
USPC ....... 455/558; 455/407; 455/41.2; 455/550.1; 705/41

(58) Field of Classification Search
USPC ............. 455/558, 407, 41.2, 550.1; 705/41
See application file for complete search history.

(56) References Cited

U.S. PATENT DOCUMENTS

| | | | |
|---|---|---|---|
| 8,437,737 B2 * | 5/2013 | Wang | 455/407 |
| 2010/0029202 A1 * | 2/2010 | Jolivet et al. | 455/41.1 |
| 2011/0053560 A1 * | 3/2011 | Jain et al. | 455/411 |
| 2011/0177852 A1 * | 7/2011 | Jain et al. | 455/575.8 |
| 2012/0178412 A1 * | 7/2012 | Yu | 455/406 |
| 2013/0005300 A1 * | 1/2013 | Wang | 455/407 |
| 2013/0102246 A1 * | 4/2013 | Gagne et al. | 455/41.1 |

* cited by examiner

*Primary Examiner* — Danh Le

(57) ABSTRACT

A mobile phone configured to complete payment transactions while the mobile phone is in a low battery shut-off state. The mobile phone comprises a secure element configured to store payment cards, a near field communication transceiver, wherein the near field communication transceiver is configured to complete a payment transaction based on a payment card stored in the secure element, a memory, a processor and an application stored in the memory. When executed by the processor, the application detects whether a power reserve is below a predefined threshold. When the power reserve is detected below the predefined threshold, the application prompts selection of a payment card stored in the secure element for use in completing payment transactions while the mobile phone is in a low battery shut-off state and configures one of the secure element or the near field communication transceiver to complete payment transactions using the selected payment card.

20 Claims, 7 Drawing Sheets

MOBILE PHONE OPERATION DURING LOW BATTERY CONDITION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices are used by nearly every adult in the United States and carried about their persons at nearly all times. The capabilities and functionality of mobile devices continue to expand as processor power of the devices increases and as wireless bandwidth likewise continues to increase. Software applications and hardware capabilities of mobile devices are beginning to support electronic payment scenarios, such that under some circumstances the mobile device may conduct an electronic payment transaction with a point-of-sale terminal and/or with a near field communication station such as a transit system entrance turnstile.

SUMMARY

In an embodiment, a mobile phone that is configured to complete payment transactions while the mobile phone is in a low battery shut-off state is disclosed. The mobile phone comprises a secure element (SE) configured to store a plurality of payment cards, a near field communication (NFC) transceiver, wherein the near field communication transceiver is configured to complete a payment transaction with an external near field communication station based on a payment card stored in the secure element, a memory, a processor, and an application stored in the memory. When executed by the processor, the application detects whether a battery power reserve of the mobile phone is below a predefined threshold, where the predefined threshold is higher than an automatic shut-off threshold. When the battery power reserve is detected below the predefined threshold, the application prompts for a selection of a payment card stored in the secure element for use in completing payment transactions while the mobile phone is in a low battery shut-off state and configures one of the secure element or the near field communication transceiver to complete payment transactions using the payment card that was selected in response to the prompt.

In an embodiment, a method for completing a payment transaction from a mobile device while the mobile device is in a low battery shut-off operation mode by using a near field communication (NFC) transceiver coupled to a secure element (SE) storing at least two payment cards, where a first payment card is designated as a selected payment card before the mobile device enters the low battery shut-off operation mode, is disclosed. The method comprises while the mobile device is in a low battery shut-off operation mode, actuating an input key of the device, while the device is in the low battery shut-off operation mode, in response to the actuation of the input key, electronically selecting a second payment card stored in a secure element of the mobile device to be the selected payment card, and while the mobile device is in the low battery shut-off operation mode, completing a payment transaction between the near field communication transceiver of the mobile device and an external near field communication station based on the selected payment card.

In an embodiment, a mobile device that is configured to complete payment transactions after the device has completed a low battery shut-off is disclosed. The mobile device comprises a cellular radio transceiver, a display, a secure element (SE) configured to store a plurality of payment cards, and a near field communication (NFC) transceiver, wherein the near field communication transceiver is configured to complete a payment transaction with an external near field communication station based on a payment card stored in the secure element. The mobile device further comprises a memory, a processor, wherein the processor is configured to turn on in a limited execution mode while in a low battery shut-off operation mode in response to a first combination of input key actuations, and an application. When executed by the processor in the limited execution mode, the application receives a second combination of input key actuations, wherein the second combination of input key actuations is different from the first combination of input key actuations, based on the second combination of input key actuations. The application also configures one of the secure element or the near field communication transceiver to complete payment transactions using a first payment card, where the first payment card is one of the plurality of payment cards stored in the secure element. When the processor executes in the limited execution mode, the cellular radio transceiver and the display of the mobile device remain powered off.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
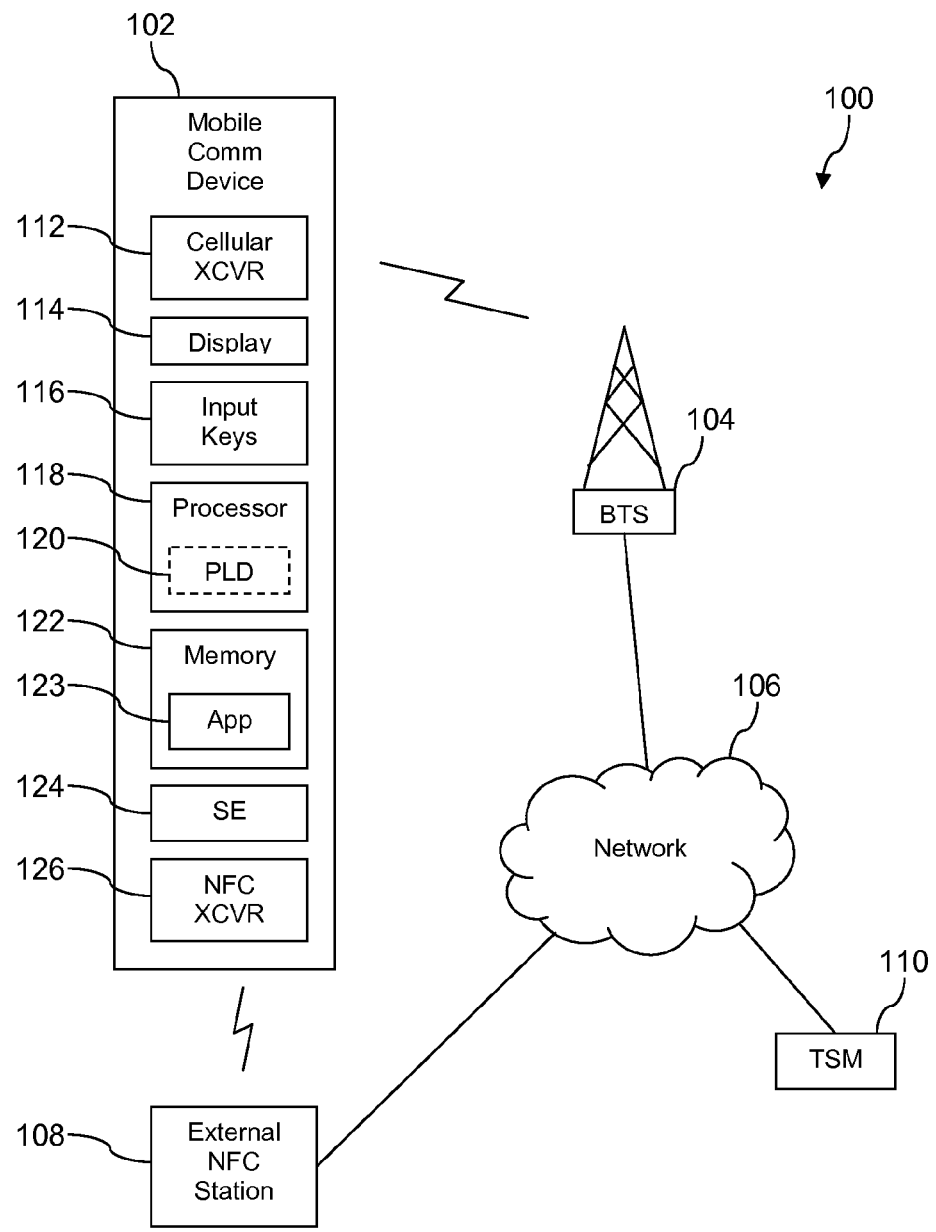
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user may use their mobile device, for example a mobile phone and/or smart phone, to complete payment transactions such as paying for riding a mass transportation vehicle or paying for goods and services. A transit payment card, a credit card, a gas card, a debit card, or other payment card may be stored in the mobile device. For example, account numbers, authorization numbers, authentication numbers, and/or personal identification numbers may be stored in the mobile device. By completing a contactless communication session with an appropriate transaction station, payment may be made by providing at least some of the information about the payment card stored in the device, for example by providing an account number and a personal identification number. A problem can arise, however, when a user becomes accustomed to using their mobile device to complete payment transactions and the user neglects to recharge their device timely. If the battery of the mobile device is discharged far enough, the mobile device may automatically shut down to conserve enough battery power to maintain high value internal operations and/or data stored in the mobile device. When the mobile device has automatically shut down in this way, the mobile device may then be unavailable to complete payment transactions.

The mobile device may have a near field communication transceiver which may be able to operate without the mobile device being powered on and/or while not booted. In this operation mode, the near field communication transceiver may complete a payment transaction based on a previously selected payment card. The present disclosure teaches an application that executes on the mobile device that monitors the battery power level, and when battery power drops below a predefined threshold, the application may prompt the user to select one of the payment cards stored in the mobile device to be a default payment card for use if the mobile device automatically shuts down in response to an excessively low battery capacity. When the battery power level drops below the predefined threshold, the application may first alert the user with a loud tone, to call the user's attention to an approaching automated mobile device shut down and to select a default payment card. When a default payment card is selected in this way, the user may be able to complete a payment transaction with a near field communication transceiver of a point-of-sale terminal or a transit turnstile. In an embodiment, the user may press and hold an input key of the mobile device to provide a path to transfer energy provided by an external radio frequency emission, for example from a near field communication transceiver of the point-of-sale terminal, to a near field communication transceiver and/or secure element of the mobile device.

When completing some payment transactions during normal operation of the mobile device using a payment card, such as a credit card, the user may be prompted to enter an authorization code and/or a personal identification number. When the mobile device is powered off, for example as a result of an automatic shutdown in response to an excessively low battery capacity, the mobile device may not receive inputs from the keyboard or touchscreen, the user may not be able to provide the authorization code and/or personal identification number and hence may be unable to complete the desired payment transaction. The present disclosure teaches storing the subject confidential information in the mobile device and supplying this while the mobile device is in an automatic shutdown state, for example when the battery power is below the predefined threshold. The application may prompt the user to input this information at the same time that he or she selects a default payment card. Alternatively, this information may already be stored with other confidential information about the payment card.

When the mobile device automatically provides the authorization code and/or personal identification number, however, the payment security of the mobile device may be reduced. To reduce the time duration of this security vulnerability, the application may further prompt the user to define a time duration during which payment transactions may be completed by the mobile device without the user providing a personal identification number. Alternatively, the application may prompt the user to define an input key actuation sequence that the application will map to a personal identification number previously stored in the mobile device, and the application would then provide this stored personal identification number in a payment transaction in response to the user inputting the defined input key actuation sequence. A touchscreen interface of a mobile device may be shutdown to conserve battery power during an automatic shutdown of the mobile device. The present disclosure teaches a user defining a sequence of volume control key actuations, for example a combination of louder-louder-quieter-louder-quieter volume key actuations, to map to the personal identification number or otherwise to trigger the application to provide the personal identification number during a payment transaction. The user may also define a time duration during which this input key actuation sequence can be used in lieu of the standard personal identification number. Because of the time limit on the duration of this functionality, if the mobile device becomes lost, the reduced security of not requiring the personal identification number to be entered by the user or to promote the substitution of the input key actuation sequence would be a transient condition.

A user may prefer to use different payment cards to complete different payment transactions. For example, the user may prefer to use a mass transit payment card to pay for riding a subway or bus while using a credit card to pay for a dinner at a restaurant. Selecting a default payment card before the mobile device shuts down, as described above, may not offer the desired flexibility. The present disclosure further teaches the user selecting a different payment card to be active by actuating a combination of input keys or actuating a sequence of input keys to put the mobile device into a card selection mode. Card selection mode is a sub-state of the mobile device when the mobile device has automatically powered off and has a battery capacity below the predefined threshold. In the card selection mode, the user may select one of a plurality of cards by actuating an input key. For example, by pressing the louder key of the volume control the user may select the next card in a predefined sequence of cards. By pressing the louder key a second time, the user may select the second card in the predefined sequence of cards. In an embodiment, the user may press and hold an input key of the mobile device to provide a path to transfer energy provided by an external radio frequency emission, for example from a near field communication transceiver of the point-of-sale terminal, to a near field communication transceiver and/or secure element of the mobile device to select one of a plurality of payment cards.

In an embodiment, the mobile device may provide distinctive feedback that indicates that the mobile device is ready to receive payment card selection inputs and that indicate which payment card has been selected. For example, a long duration beep may indicate that the mobile device is ready to receive card selection inputs. When the first card in the sequence is selected, a short duration beep may indicate that the first card is selected. When the second card in the sequence is selected, two short duration beeps may indicate that the second card is selected. The user may define the association of feedback with specific payment cards while the mobile device is in a normal powered-on execution mode.

In an embodiment, the user may activate a limited execution mode of operation of the mobile device when the device has entered the low battery shut-off mode. In the limited execution mode of operation, a cellular radio transceiver and a display of the mobile device are prevented from being powered on, as these devices may consume a large amount of power. In the limited execution mode, an application may execute on a processor of the mobile device that promotes a user entering inputs and reconfiguring payment card selections and/or receiving personal identification number inputs. In an embodiment, the application may execute on a programmable logic device (PLD) or an application specific integrated circuit that is part of the processor while the remainder of the processor, for example a microprocessor chip and/or a digital signal processor chip that consume more power, remain powered down. The application may provide simple functionality, and the programmable logic device may execute at a relatively slow processor rate to reduce power consumption.

Turning now to FIG. 1, a communication system 100 is described. In an embodiment, the system 100 comprises a mobile communication device 102, a base transceiver station (BTS) 104, a network 106, an external near field communication (NFC) station 108, and a trusted service manager (TSM) 110. The mobile communication device 102 may be referred to hereinafter as the mobile device 102. The mobile device 102 may comprise a mobile phone, a personal digital assistant (PDA), a media player, or another mobile device. The network 106 may comprise one or more private networks, one or more public networks, or a combination thereof. The external near field communication station 108 may be coupled to a point-of-sale (POS) terminal in a retail store, may be coupled to an entrance gate or turnstile of a transit system, or may be coupled to another payment transaction station.

While the external near field communication station 108 is illustrated in FIG. 1 as coupled to the network 106 by a wired communication link, in an embodiment the near field communication station 108 may be coupled by a wireless link to the network 106. In an embodiment, the external near field communication station 108 may be a mobile device that executes an application for receiving a credit card transaction or other payment card transaction from the mobile device 102. The trusted service manager 110 may be an application that executes on a computer system. Computer systems are described in detail hereinafter. It is understood that the system 100 may comprise any number of mobile devices 102, base transceiver stations 104, external near field communication stations 108, and trusted service managers 110.

In an embodiment, the mobile device 102 comprises a cellular radio transceiver 112, a display 114, a plurality of input keys 116, a processor 118, a memory 122, a secure element 124, and a near field communication transceiver 126. In an embodiment, the mobile device 102 may not comprise a cellular radio transceiver 112. The mobile device 102 may comprise a short range radio transceiver (not shown) such as a WiFi radio transceiver, a Bluetooth® radio transceiver, or other short range radio transceiver. The mobile device 102 may comprise a plurality of cellular radio transceivers 112. In an embodiment, the processor 118 may comprise a programmable logic device 120. Those skilled in the art appreciate that the processor 118 may comprise a plurality of semiconductor chips, for example a microprocessor, a digital processor, an application specific integrated circuit (ASIC), a field programmable gate array (FPGA), and/or one or more programmable logic devices 120.

The input keys 116 may comprise a power on/off key, a volume up/down key, and one or more other keys. The display 114 may provide a touch sensitive screen that both displays information as well as receives inputs. Alternatively, if the display 114 does not provide touch sensitive functionality, the mobile device 102 may comprise a key pad including keys for numbers and/or alphabetic inputs, a 5-way switch, dedicated keys, soft defined keys, and the like.

The mobile device 102 is generally powered by a battery (not shown) that may be recharged or replaced when the battery power reserve drops. When the battery power reserve drops below a predefined auto shut-off threshold, the mobile device 102 may automatically shut down and/or turn off. This may be referred to a low battery shut-off state and/or a low battery shut-off mode of operation. In the low battery shut-off mode of operation, the battery may not be completely discharged, and some functionality of the mobile device 102 may be maintained, for example an internal clock may be maintained and some volatile memory storage may be maintained.

In at least some operation modes, the near field communication transceiver 126 and/or the secure element 124 may be powered not by the battery of the mobile device 102 but instead may be powered by drawing energy from a radio frequency emission from the external near field communication station 108. In normal operation mode, the mobile device 102 may operate the cellular communication transceiver 112 to make voice calls and data calls via the base transceiver station 104 and the network 106 and may present information on the display 114. Even when not engaged in making voice calls or data calls, the cellular communication transceiver 112 may be conducting wireless communication handshaking with the base transceiver station 104.

During normal operation of the mobile device 102, for example when the battery power reserve is above the auto shut-off threshold, the mobile device 102 may be brought into vicinity of the external near field communication station 108, and a payment transaction based on a payment card stored in the secure element 124 or stored in the memory 122 may be completed. A payment card may be deemed to be stored in the secure element 124 and/or in the memory 122 when suitable confidential information related to the payment card are stored, for example when an account number associated with the payment card, an authorization number associated with the payment card, and/or a personal identification number associated with the payment card are stored. A payment transaction may be viewed as an abstract operation that results in money being transferred from a trusted service manager 110 to a bank account of a merchant or a mass transportation system. A payment transaction may also be viewed as a transaction where a prepaid account funds balance is decremented, as for example when a mass transit account holder enters a transit system via a turnstile and presents a transit payment card stored on the mobile device 102. In the case of the mass transit account holder, the money may be in the possession of the mass transit account holder before the transaction, but the transaction marks or signals the delivery of the good or service.

The user of the mobile device 102 may execute some application, for example an electronic wallet application or some other application, to select one of a plurality of payment cards stored in the mobile device 102. The payment card may be any of a transit payment card, a debit payment card, a credit card, a gas credit card, or other payment card. The secure element 124 and/or the memory 122 may store payment card account numbers, authorization codes, personal identification numbers (PINs), and/or account holder identity associated with the various payment cards. The near field communication transceiver 126 may transmit the appropriate information about the selected payment card to the external near field communication station 108 to complete the payment transaction, for example to pay a fare of a transportation system, to pay for goods or services at a point-of-sale terminal, or other payment transaction.

A user of the mobile device 102 may become accustomed to the convenience of using the payment cards stored in the mobile device 102 and leave their plastic payment cards at home. If, however, the user fails to timely recharge the battery of the mobile device 102, the mobile device 102 may undergo a low battery shut-off, and the user may be unable to complete desired payment transactions with the mobile device 102. This may be very inconvenient, for example, if the user is counting on paying a transit fare with the mobile device 102 but is prevented from entering the transit system because the mobile device 102 cannot complete the fare payment transaction.

In an embodiment, an application 123 may be stored in the memory 122 and may execute in the processor 118. The application 123 may monitor the battery power reserve of the mobile device 102. When the battery power reserve drops below a predefined threshold, a threshold that is higher than the low battery shut-off threshold, the application 123 alerts the user to the low battery power reserve and prompts the user to select a payment card for default usage when the mobile device 102 is in a low battery shut-off state. In response to the user selecting a default payment card, the application 123 may configure the secure element 124 and/or the near field communication transceiver 126 to complete payment transactions using the default payment card when the mobile device 102 is in the low battery shut-off state. If the mobile device 102 enters the low battery shut-off state, the near field communication transceiver 126 and the secure element 124 may complete a payment transaction with the external near field communication transceiver 108 based on the default payment card configured by the application 123 as selected by the user input. In the low battery shut-off state, the near field communication transceiver 126 and the secure element 124 may draw power from a radio frequency emission from the external near field communication station 108. Alternatively, the near field communication transceiver 126 and the secure element 124 may continue to receive power from the battery of the mobile during the low battery shut-off state.

The application 123 may further prompt the user to input a time duration during which the selection of the payment card may be used as a default payment card. After the expiration of the input time duration, the default payment card may no longer be valid, such that if the mobile device 102 is lost or stolen the default payment card cannot be used after the expiration of the time duration. The application 123 may further prompt the user to input a time duration during which a personal identification number (PIN) need not be entered to complete a payment transaction using the selected payment card. The application 123 may configure the near field communication transceiver 126 and/or the secure element 124 to provide the personal identification number that may be stored in the secure element 124 or in the memory 122, thereby avoiding the need for the user to input this information from the display 114 (in the event the display 114 is a touch screen) or from the input keys 116.

Alternatively, the application 123 may send a message via the cellular radio transceiver 112 via the base transceiver station 104 and the network 106 to the trusted service manager 110, to inform the trusted service manager 110 to suspend a customary payment transaction rule that calls for a personal identification number to be presented in the payment transaction. The application 123 may further indicate a delimited time period to the trusted service manager 110 during which to suspend the customary payment transaction rule about personal identification numbers. The application 123 may further prompt the user to define a maximum value of aggregate transactions that may be enacted with the default payment card during the input time duration, and this maximum value of aggregate transactions may be transmitted to the trusted service manager 110. The trusted service manager 110 may enforce the limit of maximum value of aggregate transactions. This limit of maximum value for aggregate transactions may offset, to some extent, the risk of authorizing payment transactions, if even during a delimited time period, without presentation of the personal identification number.

In an embodiment, the application 123 may prompt the user to enter the personal identification number associated with the selected default payment card and then prompt the user to define an input key actuation sequence that may be used to cause the application 123, the near field communication transceiver 126, or the secure element 124 to retrieve and use the stored personal identification number. For example, the user may indicate that a sequence of actuations of the volume input keys are to act as a proxy personal identification number, causing the normal personal identification number to be retrieved and used in completing a payment transaction. For example, a sequence of louder-louder-quieter-louder-quieter volume input key actuations may be defined to map to the personal identification number or to be a proxy for the personal identification number. The application 123 may provide the mapping or proxying to the personal identification number only for a predefined time duration. After the expiration of the predefined time duration the application 123, the near field communication transceiver 126, and/or the secure element 124 may no longer map the input key actuation sequence to the personal identification number.

In an embodiment, the application 123 or another application may execute on the programmable logic device 120 or on another small scale, low power consuming processor such as an application specific integrated circuit (ASIC). When in the low battery shut-off state, the mobile device 102 is configured to turn on in a limited execution mode in response to a predefined input key actuation or combination of input key actuations. In the limited execution mode, the programmable logic device 120 may be the only portion of the processor 118 that executes, thereby reducing the drain on the already low battery power reserve. In the limited execution mode of operation the cellular radio transceiver 112 and the display may remain powered off. If the mobile device 102 has one or more short range radio transceivers, these short range radio transceivers likewise may remain powered off while the mobile device 102 is in the limited execution mode.

To constrain their power consumption, the programmable logic device 120 and/or ASIC may be configured to have a relatively slow clock rate and a relatively limited functionality. For example, the clock rate may be slow compared to the clock rate of a microprocessor and/or digital signal processor of the mobile device 102 that execute in normal mode but are powered off during limited execution mode. Additionally, the programmable logic device 120 and/or ASIC may have a small number of logic gates in comparison with the number of logic gates of a microprocessor and/or digital signal processor of the mobile device 102 that execute in normal mode but are powered off during limited execution mode. One skilled in the art appreciates that the power consumed by a semiconductor is related to the number of logic gates in the subject semiconductor, the frequency of logic gate transitions, and the operating voltage level of the logic gates. Hence, by reducing the number of logic gates that may transition and reducing the clock frequency associated with the limited execution mode processing, the power consumption of the programmable logic device 120 and/or ASIC may be restrained. The mobile device 102 may be configured to leave the limited execution mode after a relatively short time duration, for example after less than a two minute time duration, after less than a five minute time duration, after less than a ten minute time duration, or after some other time duration.

When the mobile device 102 is in the limited execution mode, the application 123 may receive other input key actuations and map these input key actuations to the personal identification number. The application 123 may then provide the personal identification number to the near field communication transceiver 126 and/or secure element 124 to complete a payment transaction with the external near field communication station 108. Additionally, the application 123 may receive other input key actuations that prepare the application 123 to receive a new payment card selection from the user.

When the application 123 is ready to receive the payment card selection, the application 123 may cause the mobile device 102 to emit a distinctive sound to provide feedback to the user, for example a relatively long duration beep sound. When the user actuates other input keys to select a different payment card, the application 123 may cause the mobile device 102 to emit other distinctive sounds to provide feedback to the user indicating what payment card is selected. For example, a single short beep sound may be emitted to indicate that a first payment card is selected, two short beep sounds may be emitted to indicate that a second payment card is selected, three short beep sounds may be emitted to indicate that a third payment card is selected. Other distinctive sounds may be used rather than short and long beeps. The user may be prompted by the application 123 to define the feedback associated with the different payment cards stored in the mobile device 102 at the same time the application 123 prompts the user to define a default payment card when the battery was approaching the low battery shut-off level.

In an embodiment, one or more of the input keys 116 may be wired such that when the key is held in the actuated position, a circuit is closed that permits energy to be transferred from an external radio frequency energy source, for example radio frequency energy emitted by the external near field communication station 108, to the near field communication transceiver 126, the secure element 124, and/or the programmable logic device 120 or the application specific integrated circuit. If multiple input keys 116 are wired to gate the transfer of energy, which input key 116 is held actuated may further be used to select one of the plurality of payment cards to be used to complete a payment transaction. In an embodiment, the input keys 116 may be physically coupled to two switches: a first switch may be the standard switch for volume control during normal operation of the mobile device 102 and a second switch that provides the energy transfer function described here. In an embodiment, the first switch may be read by a device driver that executes in the processor during normal execution mode and which may perform a variety of functions include switch debouncing.

As an example scenario, if the mobile device 102 is in the low battery shut-down state, if the speaker volume switch is pressed and held in the louder actuation position and the mobile device 102 is held proximate to the external near field communication station 108 that is coupled to a transit system turnstile, a transit payment card stored in the secure element 124 may be used to pay a fare and cause the transit system turnstile to admit the user to the transit facility. Alternatively, if the speaker volume switch is pressed and held in the quieter actuation position and the mobile device 102 is held proximate to the external near field communication station 108 that is coupled to a grocery store point-of-sale (POS) terminal, a debit card stored in the secure element 124 may be used to pay for a grocery cart containing grocery store goods.

Figure 2:
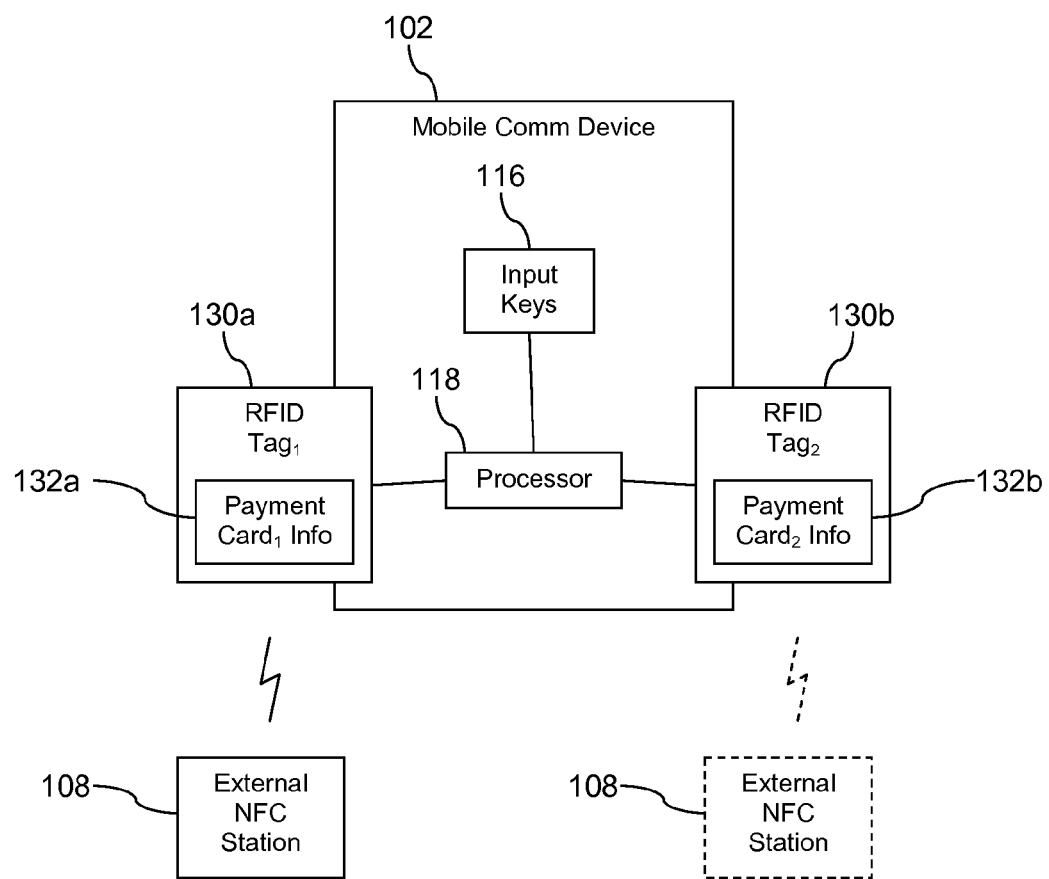
FIG. 2 is a block diagram of a portion of a mobile device according to an embodiment of the disclosure.

Turning now to FIG. 2, an alternative embodiment of the mobile device 102 is described. In an embodiment, the mobile device 102 further comprises a first radio frequency identification (RFID) tag 130a and a second RFID tag 130b. The RFID tags 130 may be coupled to a package or housing of the mobile device 102. Alternatively, the RFID tags 130 may be plugged into connectors or connector slots of the mobile device 102. The processor 118 may be in communication with the RFID tags 130. The processor 118 may configure the first RFID tag 130a to store information about a first payment card 132a and configure the second RFID tag 130b to store information about a second payment card 132b. The information may comprise payment card account numbers, authorization numbers, personal identification numbers, and the like information needed to complete a payment transaction using the subject payment cards. The application 123 may prompt the user to select what payment card to store in the first RFID tag 130a and what payment card to store in the second RFID tag 130b, for example when the application 123 detects that the battery power reserve has dropped below the predefined threshold.

The RFID tags 130 may be able to autonomously complete a payment transaction with the external near field communication station 108. The RFID tags 130 may be placed on opposing sides or faces of the mobile device 102, such that when the first RFID tag 130a is positioned for communicating with the external near field communication station 108, the second RFID tag 130b is positioned facing away and out of communication coverage of the external near field communication station 108 and when the second RFID tag 130b is positioned for communicating with the external near field communication station 108, the first RFID tag 130a is positioned facing away and out of communication coverage of the external near field communication station 108.

In an embodiment, the mobile device 102 may comprise a shield that may be placed over one of the RFID tags 130 to block the communication of the external near field communication station 108. Alternatively, the RFID tags 130 may comprise a defeat switch that disables the RFID tag 130 when the defeat switch is activated. In an embodiment, the RFID tags 130 may be disabled until an input key 116 is pressed and held. When the input key 116 is pressed and held, one of the RFID tags 130 associated with the subject input key 116 is selected active and may complete the payment transaction with the external near field communication station 108.

The user is able to select a payment card to use for completing a payment transaction when the mobile device 102 is in the low battery shut-off mode by holding the appropriate RFID tag 130 close to the external near field communication station 108. Additionally, the default payment card configured in the secure element 124 and/or the near field communication transceiver 126 may provide a third payment card alternative for completing payment transactions by the mobile device 102 when in the low battery shut-off mode.

Figure 3:
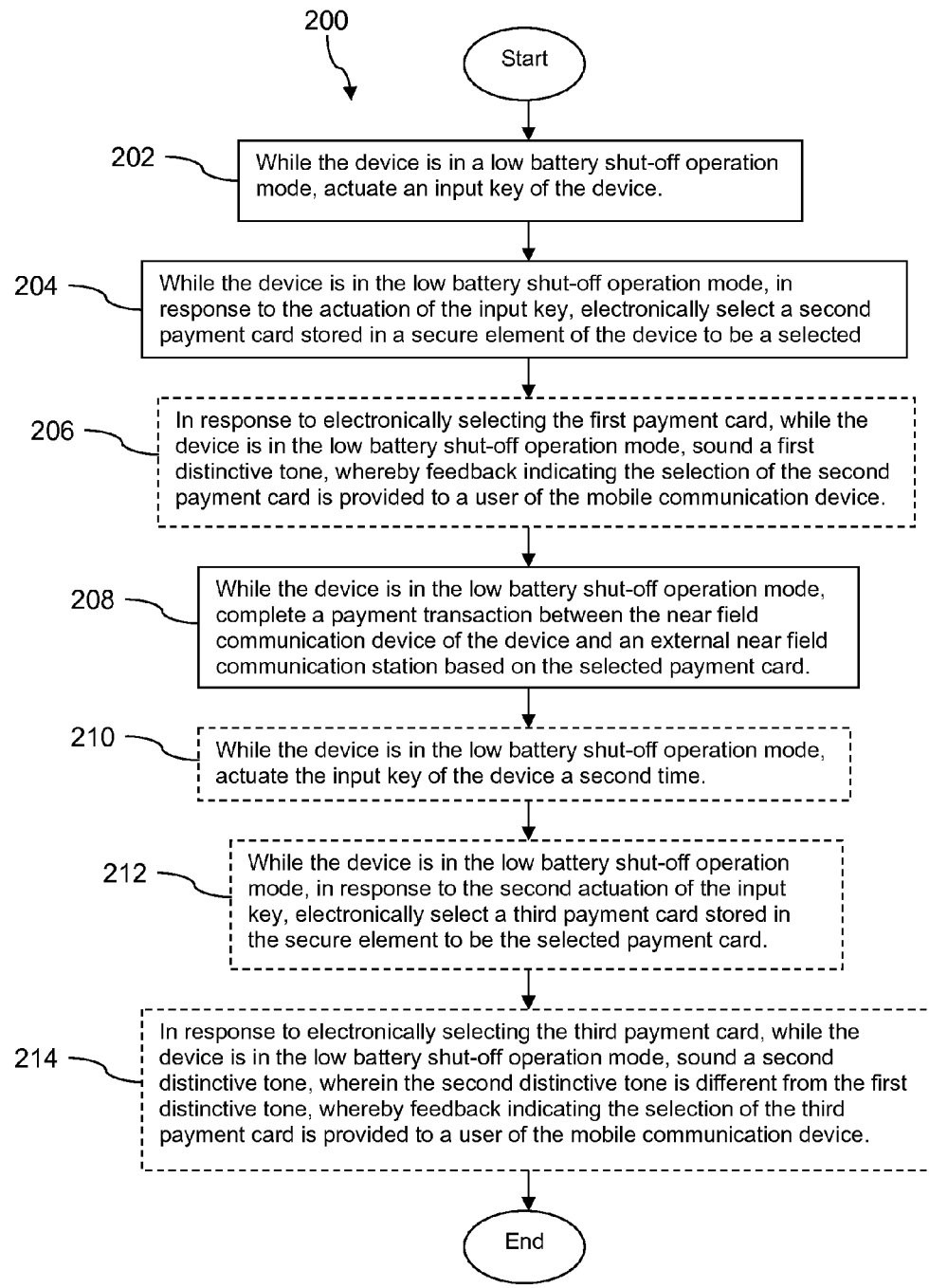
FIG. 3 is a flow chart of a method according to an embodiment of the disclosure.

Turning now to FIG. 3, a method 200 is described. Before the method starts, it is assumed the mobile device 102 has gone into low battery shut-off operation mode. Also, it is assumed that a plurality of payment cards are stored in the mobile device 102, for example stored in the secure element 124 and/or in the near field communication transceiver 126, and that a first one of the payment cards has been designated as a selected payment card and/or as a default payment card. At block 202, while the mobile device is in a low battery shut-off operation mode, actuate an input key of the mobile device. At block 204, while the device is in the low battery shut-off operation mode, in response to the actuation of the input key, electronically select a second payment card stored in a secure element of the mobile device to be a selected payment card and/or a default payment card. This may be referred to as changing the selected payment card or changing the default payment card. This may be useful when a user of the mobile device 102 needs to pay for goods and/or services while the mobile device 102 is in low battery shut-off operation mode and some of the goods and services cannot readily or conveniently be paid for with the first payment card. At block 206, an optional action is, in response to electronically selecting the second payment card, while the mobile device is in the low battery shut-off operation mode, sound a first distinctive tone, whereby feedback indicating the selection of the second payment card is provided to a user of the mobile device. At block 208, while the mobile device is in the low battery shut-off operation mode, complete a payment transaction between the near field communication transceiver of the mobile device and an external near field communication station based on the selected payment card.

The processing of blocks 210, 212, and 214 are optional. At block 210, while the mobile device is in the low battery shut-off operation mode, actuate the input key of the mobile device a second time. At block 212, while the mobile device is in the low battery shut-off operation mode, in response to the second actuation of the input key, electronically select a third payment card stored in the secure element to be the selected payment card. At block 214, in response to electronically selecting the third payment card, while the mobile device is in the low battery shut-off operation mode, sound a second distinctive tone, wherein the second distinctive tone is different from the first distinctive tone, whereby feedback indicating the selection of the third payment card is provided to a user of the mobile device. It is understood that electronically selecting may be performed by actuating input keys 102 that create open circuits or paths to ground that are observable by the near field communication transceiver 126 and/or the secure element 124.

Figure 4:
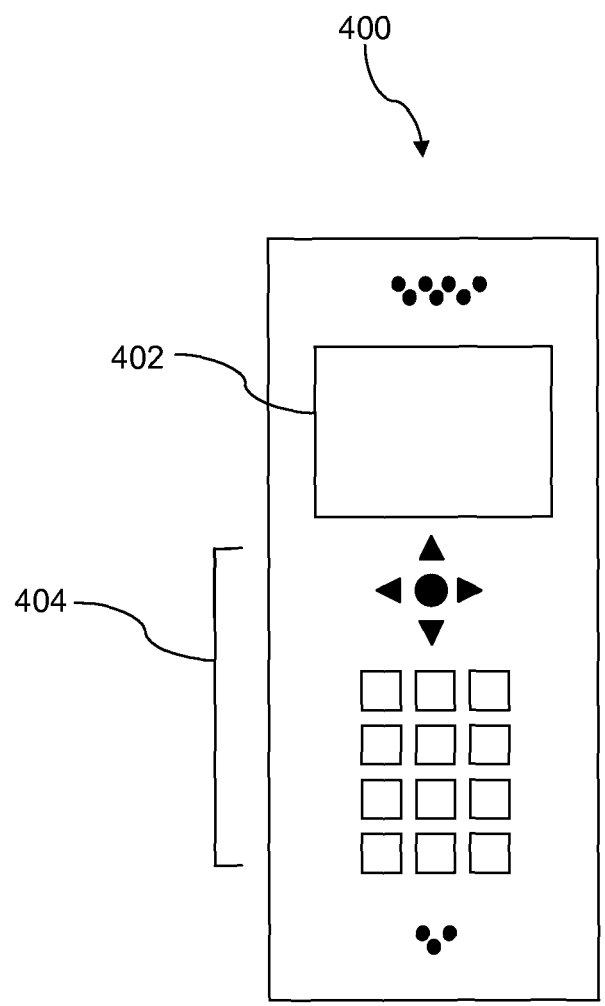
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 may be used to implement the mobile device 102 described above. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
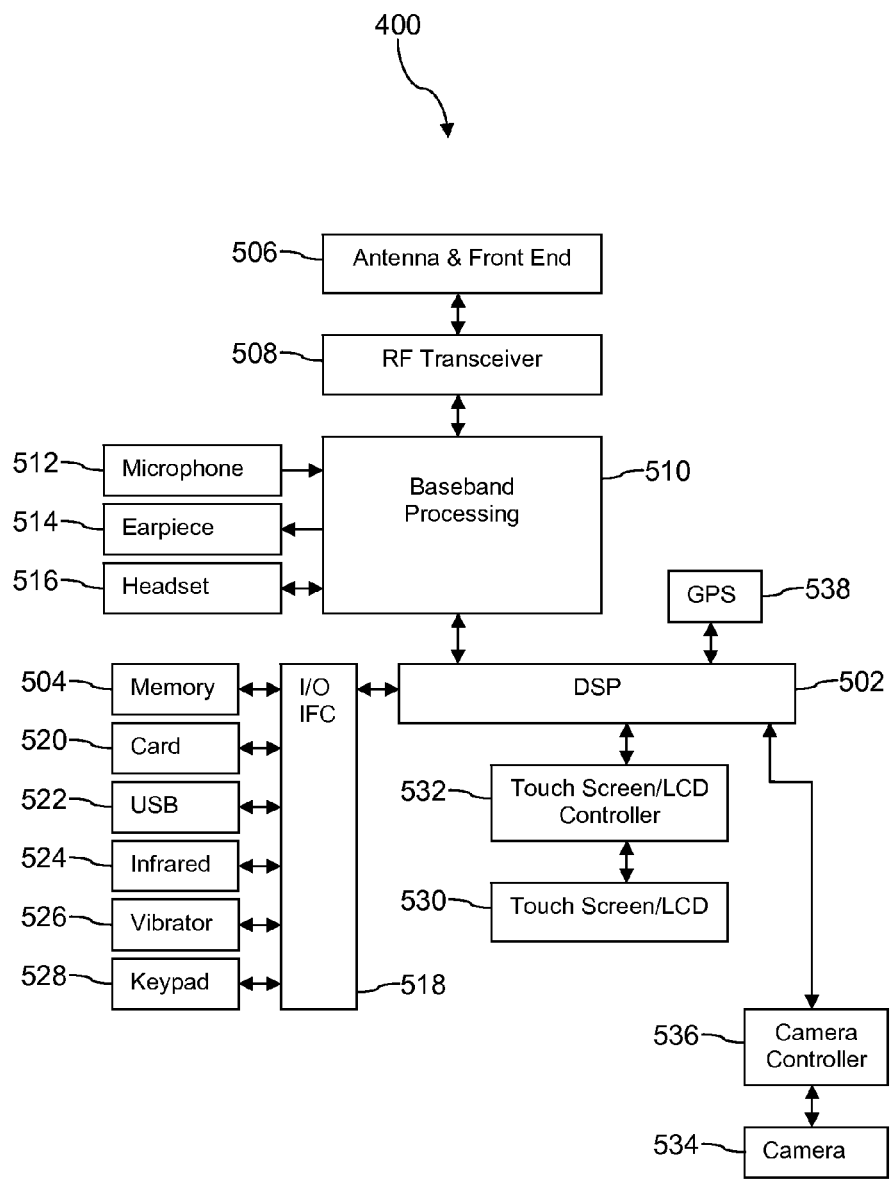
FIG. 5 is a block diagram of a hardware architecture of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
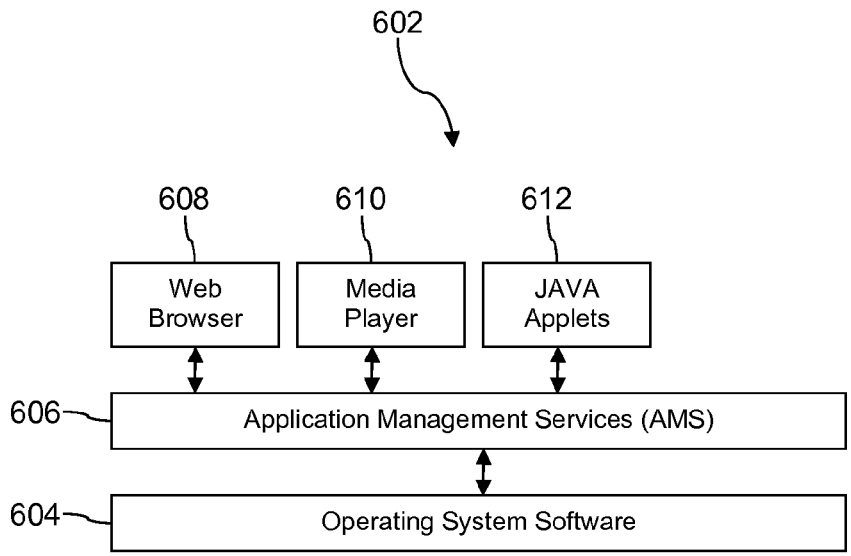
FIG. 6A is a block diagram of a software architecture of a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
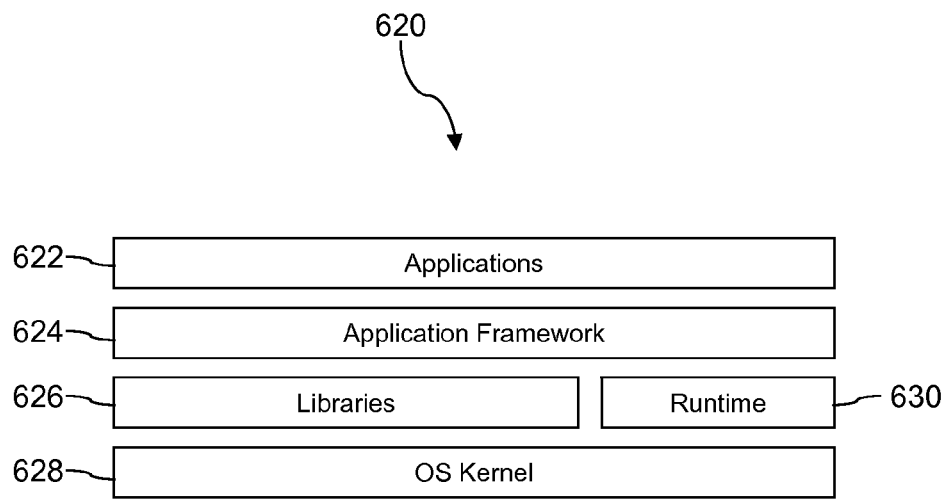
FIG. 6B is block diagram of another software architecture of a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
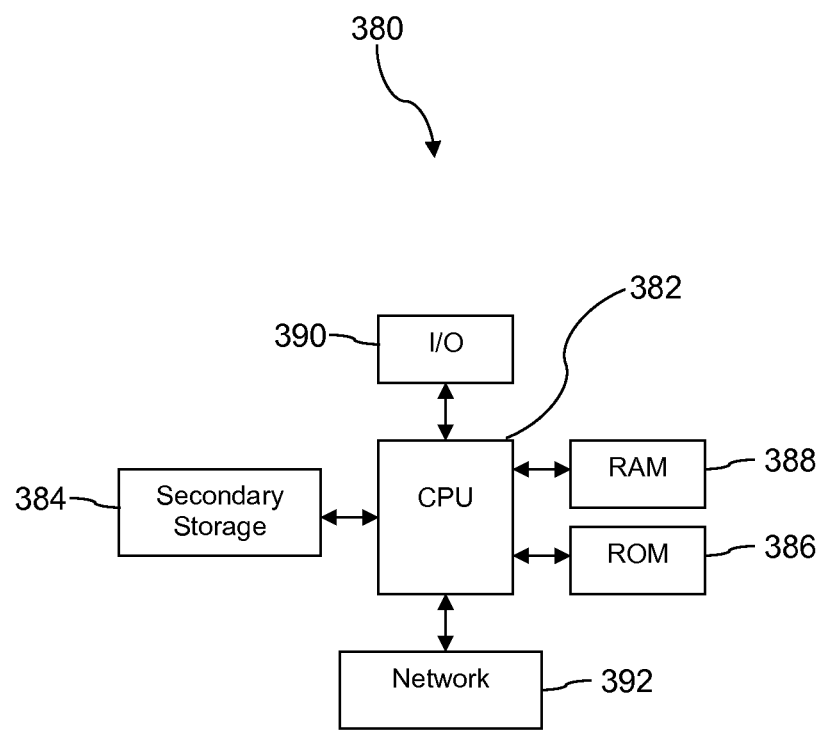
FIG. 7 is a block diagram of a computer system according to an embodiment of the disclosure.

FIG. 7 illustrates a computer system 380 suitable for implementing one or more embodiments disclosed herein. In some respects, the mobile device 102 may be considered to be implemented as a computer system. The trusted service manager 110 may be implemented as a computer, or the services provided to the system 100 by the trusted services manager 110 may be provided by a computer. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for completing a payment transaction from a mobile device while the mobile device is in a low battery shut-off operation mode by using a near field communication (NFC) transceiver coupled to a secure element (SE) storing at least two payment cards, where a first payment card is designated as a selected payment card before the mobile device enters the low battery shut-off operation mode, comprising:
   while the device is in a low battery shut-off operation mode, actuating an input key of the mobile device;
   while the mobile device is in the low battery shut-off operation mode, in response to the actuation of the input key, electronically selecting a second payment card stored in a secure element of the mobile device to be the selected payment card; and while the mobile device is in the low battery shut-off operation mode, completing a payment transaction between the near field communication transceiver of the mobile device and an external near field communication station based on the selected payment card.

2. The method of claim 1, further comprising in response to electronically selecting the second payment card, while the mobile device is in the low battery shut-off operation mode, sounding a first distinctive tone, whereby feedback indicating the selection of the second payment card is provided to a user of the mobile device.

3. The method of claim 1, further comprising
while the device is in the low battery shut-off operation mode, actuating the input key of the mobile device a second time; and
while the mobile device is in the low battery shut-off operation mode, in response to the second actuation of the input key, electronically selecting a third payment card stored in the secure element to be the selected payment card.

4. The method of claim 3, further comprising in response to electronically selecting the third payment card, while the mobile device is in the low battery shut-off operation mode, sounding a second distinctive tone, wherein the second distinctive tone is different from the first distinctive tone, whereby feedback indicating the selection of the third payment card is provided to a user of the mobile device.

5. The method of claim 1, wherein the mobile device is one of a mobile phone, a personal digital assistant, and a media player.

6. The method of claim 1, wherein the secure element stores at least a transit payment card and credit card.

7. The method of claim 1, wherein the secure element further stores a personal identification number, further comprising, while the mobile device is in the low battery shut-off operation mode, providing a combination of input key actuations, and wherein the payment transaction is completed further based on providing the personal identification number in response to the combination of input key actuations.

8. A mobile device that is configured to complete payment transactions after the device has completed a low battery shut-off, comprising:
a cellular radio transceiver;
a display;
a secure element (SE) configured to store a plurality of payment cards;
a near field communication (NFC) transceiver, wherein the near field communication transceiver is configured to complete a payment transaction with an external near field communication station based on a first payment card of the plurality of payment cards stored in the secure element;
a memory;
a processor, wherein the processor is configured to turn on in a limited execution mode while in a low battery shut-off operation mode in response to a first combination of input key actuations;
an application that, when executed by the processor in the limited execution mode,
receives a second combination of input key actuations, wherein the second combination of input key actuations is different from the first combination of input key actuations,
based on the second combination of input key actuations, configures one of the secure element or the near field communication transceiver to complete payment transactions using a second payment card of the plurality of payment cards stored in the secure element;
wherein when the processor executes in the limited execution mode, the cellular radio transceiver and the display of the mobile device remain powered off.

9. The mobile device of claim 8, wherein the processor comprises a programmable logic device or an application specific integrated circuit (ASIC), wherein the programmable logic device or application specific integrated circuit executes in the limited execution mode, and where in the application executes in the programmable logic device or in the application specific integrated circuit.

10. The mobile device of claim 9, wherein the portion of the processor that does not include the programmable logic device or the application integrated circuit remains powered off while the programmable logic device or the application specific integrated circuit executes in the limited execution mode.

11. The mobile device of claim 8, where in response to receiving the second combination of input key actuations, the application sounds a first distinctive tone, whereby feedback indicating the selection of the second payment card is provided to a user of the mobile device.

12. The mobile device of claim 8, wherein the application further
receives a third combination of input key actuations, wherein the third combination of key actuations is different from both the first combination of input key actuations and the second combination of input key actuations, and
based on the third combination of input key actuations, configures one of the secure element and the near field communication transceiver to provide a personal identification number stored in the secure element to complete payment transactions.

13. The mobile device of claim 12, where in response to receiving the third combination of input key actuations, the application sounds a second distinctive tone, wherein the second distinctive tone is different from the first distinctive tone, whereby feedback indicating the selection of the second payment card is provided to a user of the mobile device.

14. The mobile device of claim 8, wherein the mobile device is one of a mobile phone, a personal digital assistant (PDA), or a media player.

15. The mobile device of claim 8, wherein the first payment card and the second payment card are one of the same or different payment cards.

16. The mobile device of claim 8, wherein the application, when executed by the processor prior to turning on in the limited execution mode:
detects whether a battery power reserve of the mobile device is below a predefined threshold, where the predefined threshold is higher than an automatic shut-off threshold,
when the battery power reserve is detected below the predefined threshold, prompts for a selection of a default payment card of the plurality of payment cards stored in the secure element for use in completing payment transactions while the mobile device is in the low battery shut-off operation mode, and
configures one of the secure element or the near field communication transceiver to complete payment transactions using the default payment card that was selected in response to the prompt.

17. The mobile device of claim 16, wherein the application further configures one of the secure element or the near field communication transceiver to complete the payment transactions without providing a personal identification number (PIN) for a predefined period of time after the mobile device enters the low battery shut-off operation mode.

18. The mobile device of claim 17, wherein the application further prompts for an input of the predefined period of time when the battery power reserve is detected below the predefined threshold.

19. The mobile device of claim 16, wherein the application further:
- prompts for an input of a personal identification number (PIN) when the battery power reserve is detected below the predefined threshold, and
- stores the personal identification number in the secure element, wherein when the mobile device completes a payment transaction while in the low battery shut-off operation mode, the near field transceiver reads the personal identification number from the secure element and transmits the personal identification number to an external near field communication transceiver.

20. The mobile device of claim 19, wherein the mobile device deletes the personal identification number from the secure element when the mobile device is rebooted after it has been recharged.

* * * * *